(12) United States Patent
Seleznev et al.

(10) Patent No.: US 12,005,501 B2
(45) Date of Patent: Jun. 11, 2024

(54) ADDITIVE MANUFACTURING PROCESS FOR FORMING A METAL PART USING CERAMIC SUPPORT AND BODIES FORMED THEREBY

(71) Applicant: Markforged, Inc, Watertown, MA (US)

(72) Inventors: Maxim Seleznev, Arlington, MA (US); Joseph Roy-Mayhew, Watertown, MA (US)

(73) Assignee: Markforged, Inc., Waltham, MA (US)

( * ) Notice: Subject to any disclaimer, the term of this patent is extended or adjusted under 35 U.S.C. 154(b) by 0 days.

(21) Appl. No.: 18/147,987

(22) Filed: Dec. 29, 2022

(65) Prior Publication Data

US 2024/0009737 A1    Jan. 11, 2024

Related U.S. Application Data

(60) Provisional application No. 63/358,643, filed on Jul. 6, 2022.

(51) Int. Cl.
| | |
|---|---|
| *B22F 10/38* | (2021.01) |
| *B22F 1/10* | (2022.01) |
| *B22F 10/10* | (2021.01) |
| *B22F 10/34* | (2021.01) |
| *B22F 10/64* | (2021.01) |
| *B22F 10/85* | (2021.01) |
| *B28B 1/00* | (2006.01) |
| *B32B 15/04* | (2006.01) |
| *B33Y 10/00* | (2015.01) |
| *B33Y 40/20* | (2020.01) |

(Continued)

(52) U.S. Cl.
CPC ................ *B22F 10/38* (2021.01); *B22F 1/10* (2022.01); *B22F 10/10* (2021.01); *B22F 10/34* (2021.01); *B22F 10/64* (2021.01); *B22F 10/85* (2021.01); *B28B 1/001* (2013.01); *B32B 15/04* (2013.01); *B33Y 10/00* (2014.12); *B33Y 40/20* (2020.01); *B33Y 50/02* (2014.12); *B33Y 80/00* (2014.12); *B22F 2998/10* (2013.01)

(58) Field of Classification Search
CPC .......... B22F 10/38; B33Y 50/02; B33Y 80/00
See application file for complete search history.

(56) References Cited

U.S. PATENT DOCUMENTS

| | | |
|---|---|---|
| 2018/0154437 A1 | 6/2018 | Mark |
| 2018/0154439 A1 | 6/2018 | Mark |

(Continued)

*Primary Examiner* — Colin W. Slifka
(74) *Attorney, Agent, or Firm* — Venable LLP

(57) ABSTRACT

A method of manufacturing a part formed of metal, a method of determining a ceramic support structure for the metal part, and an un-sintered metal part including the ceramic support. The method of manufacturing the part includes forming a metal part and forming a ceramic support by depositing a ceramic composite material in a pattern to form ceramic print layers. The ceramic support supports a supportable portion of the metal part. The method of determining the ceramic support structure for the metal part includes determining, (i) a composition of a ceramic filament used to produce the ceramic support or (ii) a geometry of an infill of the ceramic support such that the ceramic support has a strength sufficient to support the supportable portion prior to sintering and is deformable to allow the supportable portion to undergo geometric changes during sintering.

20 Claims, 13 Drawing Sheets

(51) Int. Cl.
B33Y 50/02 (2015.01)
B33Y 80/00 (2015.01)

(56) References Cited

U.S. PATENT DOCUMENTS

2018/0154580 A1\* 6/2018 Mark .................. B22F 3/24
2021/0197493 A1 7/2021 Mark et al.

\* cited by examiner

US 12,005,501 B2

ADDITIVE MANUFACTURING PROCESS FOR FORMING A METAL PART USING CERAMIC SUPPORT AND BODIES FORMED THEREBY

CROSS-REFERENCE TO RELATED APPLICATION

This application claims the benefit under 35 U.S.C. § 119(e) of U.S. Provisional Patent Application No. 63/358,643, filed Jul. 6, 2022, and titled "COLLAPSIBLE CERAMIC SUPPORTS," the entirety of which is incorporated herein by reference.

FIELD OF THE INVENTION

The invention relates to additive manufacturing processes, particularly additive manufacturing processes for metal parts and the bodies formed thereby.

BACKGROUND OF THE INVENTION

Additive manufacturing processes for metal parts or other parts incorporating metal material may utilize a multi-step process. First, a printing operation that deposits metal material may be performed and then a sintering operation to heat and fix the metal material is performed. Depending upon the printing process used, the manufacturing operation may also include additional processes, such as a wash operation, between printing and sintering operations. Prior to undergoing the sintering operation, a part may require temporary support features to be included at certain portions. Such supports may be needed to maintain a desired geometry of deposited metal material. For example, geometric features, such as holes, cavities, and overhangs, may require the addition of these support features. The support features are not included in the final part and are used for support until the part is sintered where the features being supported are fixed.

SUMMARY OF THE INVENTION

In one aspect, the invention relates to a method of manufacturing a part. The method includes depositing a metal composite material in a pattern to form layers of the part. The metal composite material includes sinterable metal particles, and the metal part includes a supportable portion. The method also includes depositing a ceramic composite material in a geometry to form one or more ceramic supports for the metal part.

In another aspect, the invention relates to a method of determining a ceramic support structure for a metal part to be produced by additive manufacturing. The method includes receiving, using at least one processor, a geometry for a metal part. The geometry of the metal part includes a supportable portion. The method also includes calculating, using the least one processor, the amount of shrinkage during sintering of the metal part, and calculating, using the least one processor, the strength of the supportable portion during sintering as the metal part shrinks. The method further includes determining, using the least one processor, at least one of (i) a composition of a ceramic filament used to produce a ceramic support to support the supportable portion and (ii) a geometry of an infill of the ceramic support. The at least one of the composition of the ceramic filament and the geometry of the infill are determined such that the ceramic support has a strength sufficient to support the supportable portion prior to sintering and is compliant so as to allow the supportable portion to undergo geometric changes during sintering. In addition, the method includes outputting, using the least one processor, machine readable instructions to produce the ceramic support with the at least one of the determined composition of the ceramic filament and the determined geometry of the infill.

In a further aspect, the invention relates to an un-sintered metal part including a metal structure and a ceramic support. The metal structure is formed of a metal composite material. The metal composite material includes a binder and sinterable metal particles, and the metal structure includes a supportable portion. The ceramic support is configured to support the supportable portion and formed of a ceramic composite material. The ceramic composite material includes a binder and ceramic particles. The ceramic support is positioned such that portions of the ceramic support abut portions of the supportable portion.

These and other aspects of the invention will become apparent from the following disclosure.

BRIEF DESCRIPTION OF THE DRAWINGS

FIG. 5A is a plan view of an infill of the ceramic support having a vertical triangular prism morphology. FIG. 5B is a plan view of an infill of the ceramic support having an orthogonal grid support morphology. FIGS. 5C-5E are plan views of an infill of the ceramic support having an accordion support morphology. FIG. 5F is a perspective view of an infill of the ceramic support having a gyroid support morphology. FIG. 5G is plan view of an infill of the ceramic support having a hexagonal support morphology. FIG. 5H is a plan view of an infill of the ceramic support having a sinusoidal support morphology.

DETAILED DESCRIPTION OF THE PREFERRED EMBODIMENTS

As noted above, metal parts that are produced by additive manufacturing, including 3D printing, may include portions that are not self-supporting or feature sharp overhangs. Such parts may require support structures to make printing possible. In metal fused filament fabrication (FFF), for example, the support structures may be printed with the same metal material used for the part itself, as disclosed in, for example, U.S. Patent Application Pub. No. 2021/0197493, which is incorporated by reference herein in its entirety. In such a case, ceramic material may be used as a separation layer between the part and its support structures, so that supports and a support raft supporting the part and the supports can be easily removed after a sintering operation. Because the supports and part share physical, chemical, and thermal properties, during subsequent operations such as solvent debinding and sintering, the part and supports are subjected to the same external factors and respond in the same way. In some applications, this approach may work reasonably well.

Using the metallic supports, however, may not work for other applications. For instance, for parts with complex internal shapes like a winding channel, it may be difficult to remove the metal supports from within the part (e.g., the support within the channel). Embodiments discussed herein utilize a ceramic support instead of metal supports. Ceramic supports are more brittle than metal supports, thereby allowing, after sintering, the crushing of the ceramic supports outside and inside the sintered part, leaving the part intact while allowing the ceramic material to be removed by being scraped or washed out of the part. Ceramics, however, have different physical, chemical, and thermal properties than the metal part, and thus present additional challenges that must be overcome. For example, the ceramic material should print well in the 3D printing process used to form the part and supports. The ceramic supports should also respond adequately to solvent debinding and result in stable structures after sintering. At the same time, printed ceramic support structures, especially internal ones, should not be too strong, or the ceramic support will distort, crack, or form other defects in the metal part during sintering. During temperatures employed during the sintering process, the metal shrinks more than the ceramics. Accordingly, embodiments discussed utilize a ceramic filament material and collapsible infill geometries for the ceramic support to overcome such challenges.

Figure 1:
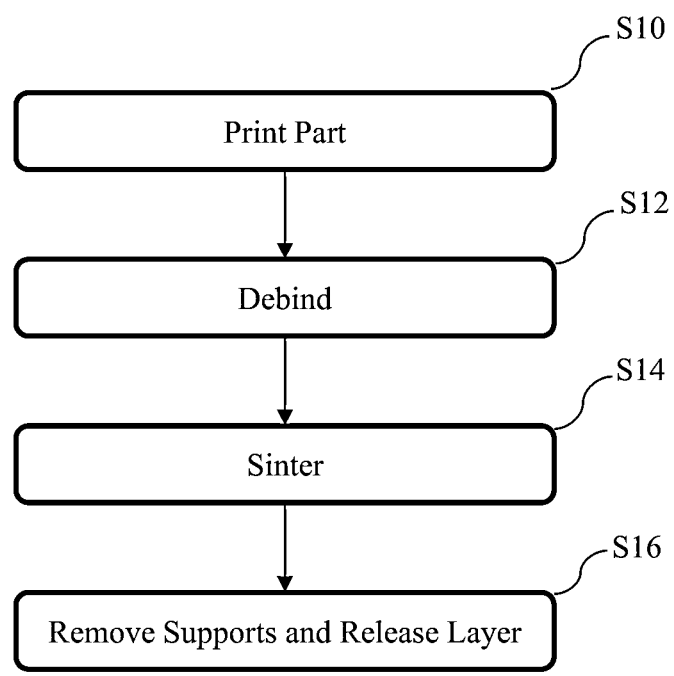
FIG. 1 is a flow chart for a method of forming a metal part according to an embodiment of the present invention by additive manufacturing.

FIG. 1 is a flow chart for a method of forming a metal part according to an embodiment of the present invention by additive manufacturing. Each of these steps will be discussed in more detail below. The process includes, in step S10, printing a metal part 210 (see FIG. 4) together with supporting structures such as a raft 220 (see FIG. 4) and ceramic supports 230 (see FIG. 4) to form a green body 200 (see FIG. 4), the supporting structures being used to aid in the subsequent processing steps. The part 210 is printed with a metal particulate and a binder. In Step S12, the binder is removed (via debinding) to form a brown body 200, and then the part is sintered in step S14 to form metallurgical bonds between the metal particulates. In step S16, the supporting structures (e.g., raft 220 and ceramic supports 230) are removed, leaving the as-sintered part 210.

As noted above, one aspect of the present invention relates to forming a metal part by additive manufacturing, such as 3D printing, by depositing a metal composite material to form a metal part and depositing a ceramic composite material to form a ceramic support (step S10 in FIG. 1). For convenience, features of the invention will be described using fused filament fabrication (FFF) with reference to a fiber or filament as the 3D printing material. However, any suitable 3D printing process or other additive manufacturing process may be used, including, for example, extrusion printing, binder jetting, or selected laser sintering. When these other manufacturing processes are used, other forms of 3D printing material suitable to those processes may be used and features of the invention disclosed below for the printing material (e.g., the metal filament 134 and the ceramic filament 144, see FIG. 2) may be adapted to such processes and printing materials.

Figure 2:
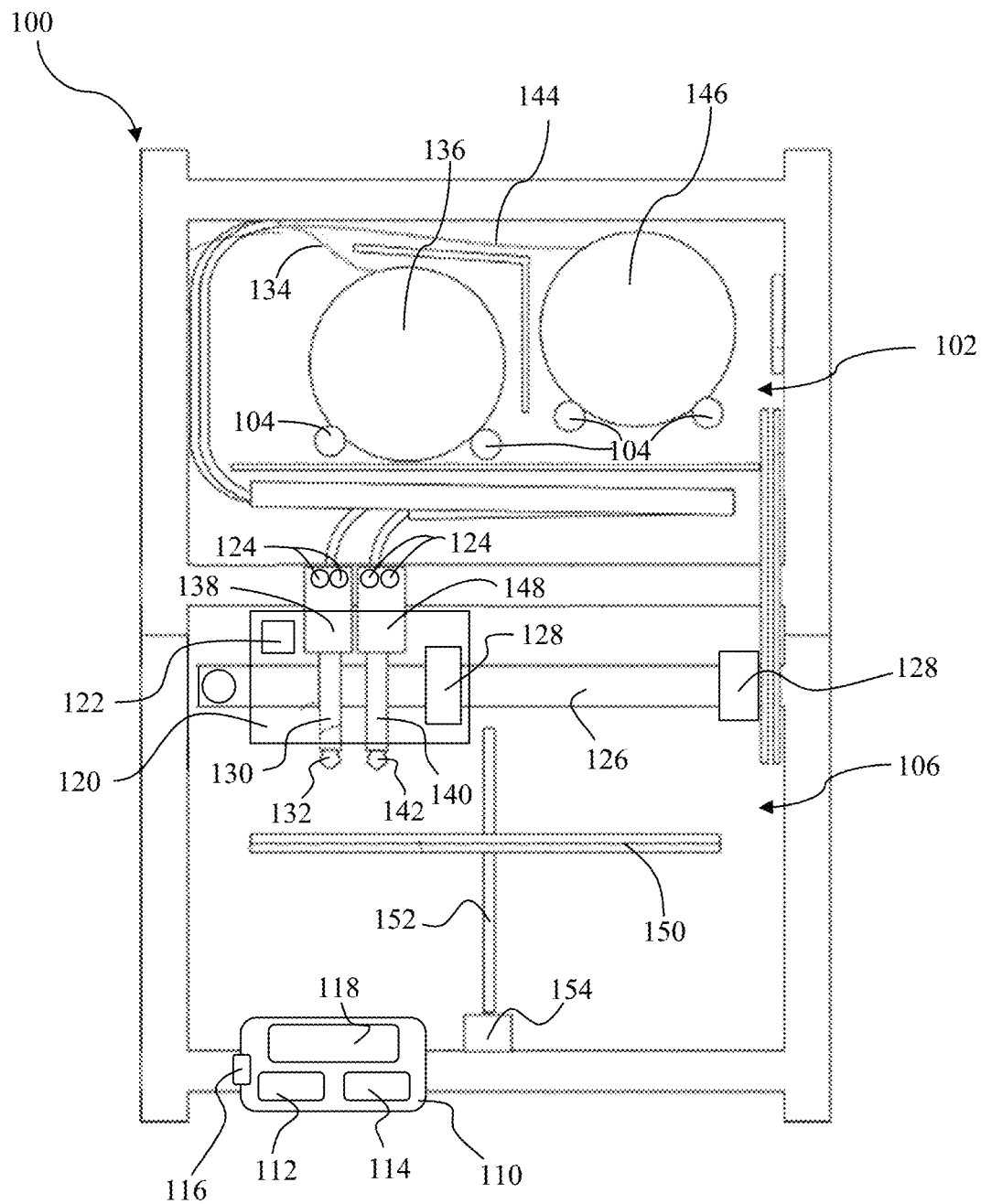
FIG. 2 shows a 3D printer that may be used to print (form) a metal part in the method shown in FIG. 1.

FIG. 2 illustrates a 3D printer 100 that may be used to print (form) a metal part in accordance with preferred embodiments of the invention. As noted above, the 3D printer 100 shown in FIG. 2 and described herein is a 3D printer 100 that forms the metal part using FFF, but other suitable printers and processes may be used. The 3D printer 100 of this embodiment includes a controller 110, one or more print heads 130, 140, and a build platen 150 (e.g., print bed). The 3D printer 100 of this embodiment, includes two print heads, e.g., a first print head 130 and a second print head 140, which form part of a print head carriage 120. Although the 3D printer 100 of this embodiment is shown with two print heads, the 3D printer 100 may be equipped with more than two print heads. In addition, although the first print head 130 and the second print head 140 are shown and described as being part of the same print head carriage 120 and, as described below, are moved together, the first print head 130 and the second print head 140 may alternatively be separate print heads that move independently of each other.

The first print head 130 includes a first nozzle 132 which, in one embodiment, deposits a metal composite material including sinterable metal particles (particulate) and a binder. The second print head 140 includes a second nozzle 142 which, in one embodiment, deposits a ceramic composite material including ceramic particles (particulate) and a binder. An extrusion process is used to deposit the metal composite material from a first filament including a metal material (a metal filament 134) and the ceramic composite material from a second filament including a ceramic material (a ceramic filament 144). The metal filament 134 and the ceramic filament 144 are the feed stock material for the printing process. In the discussion below, reference may be made to the composition of the metal filament 134 or the ceramic filament 144, such a reference also applies to the metal composite material or to the ceramic composite material.

The metal composite material and thus the metal filament 134 includes spheres, beads or powder (e.g., particulate) of a sinterable metal. Commercially available metals suitable for printing include aluminum, titanium, and stainless steel as well as other metals resistant to oxidation at both high and low temperatures (e.g., amorphous metal, glassy metal, or metallic glass). In some embodiments, the metal composite material may also include a fiber filler material. Some candidate secondary matrix-filler combinations that may be deposited by the 3D printer 100 within a binder or polymer primary matrix include cobalt or bronze beads with tungsten carbide coated graphite (carbon) fibers, aluminum beads with graphite (carbon) fibers, steel beads with boron nitride fibers, aluminum beads with boron carbide fibers, aluminum beads with nickel coated carbon fibers, alumina beads with carbon fibers, titanium beads with silicon carbide fibers, copper beads with aluminum oxide particles (and carbon fibers), and copper-silver alloy beads with diamond particles. Carbon forms for particles or fibers include, for example, carbon nanotubes; carbon blacks; short, medium, or long carbon fibers; graphite flakes; platelets; graphene; carbon onions; and astralenes.

The ceramic composite material and thus the ceramic filament 144 includes spheres, beads or powder (e.g., particulate) of a ceramic material. Suitable ceramic materials include, for example, alumina, magnesia, zirconia, yittria, silicon carbide, mullite, silicon nitride, aluminum nitride, boron carbide, and combinations thereof.

The binder material may be a polymer binder, preferably a thermoplastic polymer, like polypropylene, polymethyl methacrylate (PMMA). Polymers that have a low carbon residue upon thermal decomposition (or thermolysis) are preferred. Some soluble-pyrolysable binder combinations include polyethylene glycol (PEG) and polymethyl methacrylate (PMMA) (stearic acid optional, PMMA in emulsion form optional); waxes (carnauba, bees wax, paraffin) mixed with steatite and/or polyethylene (PE); PEG, polyvinylbutyral (PVB) and stearic acid. Some pyrolysable second stage binders (binders that will be removed during a second stage of debinding, discussed below) include: polyolefin resins polypropylene (PP), high-density polyethylene (HDPE); linear low-density polyethylene (LLDPE), and polyoxymethylene copolymer (POM).

The feed stock material may be stored in any suitable storage container or reservoir for the form of the feed stock material. In this embodiment, the feed stock material is the metal filament 134 and the ceramic filament 144, but other feed stock forms include, for example, rods, pellets, powders, and pastes. Suitable forms storage containers for the metal filament 134 and the ceramic filament 144 include, for example, spools. In this embodiment, the metal filament 134 is wound on a first spool (metal filament spool 136), and the ceramic filament 144 is wound on a second spool (ceramic filament spool 146). Each of the metal filament spool 136 and the ceramic filament spool 146 are stored in a storage chamber 102 of the 3D printer 100. The storage chamber 102 of this embodiment is heated and is located above the print head carriage 120 and the build platen 150. In the embodiment shown in FIG. 2, the metal filament spool 136 and the ceramic filament spool 146 are vertically arranged in a rotating spool holder (e.g., on rollers 104), but other suitable arrangements of the metal filament spool 136 and the ceramic filament spool 146 may be used in the storage chamber 102 including those shown and described in U.S. Patent Application Pub. No. 2018/0154439, the disclosure of which is incorporated by reference herein in its entirety, and, more specifically, shown and described in FIGS. 14 and 16 of U.S. Patent Application Pub. No. 2018/0154439.

As noted above, an extrusion process is used to deposit the metal composite material from the metal filament 134 and the ceramic composite material from the ceramic filament 144. The print head carriage 120 includes one or more heaters 122 to heat and melt metal composite material and, more specifically, the binder of the metal filament 134 within a melt chamber 138 of the first print head 130. Likewise, the heater 122 may be used to heat and melt ceramic composite material and, more specifically, the binder of the ceramic filament 144 with in a melt chamber 148 of the second print head 140. Feed rollers 124 may be used to feed the metal filament 134 and the ceramic filament 144 to the first print head 130 and the second print head 140, respectively. In this embodiment, the feed rollers 124 are arranged directly upstream of the melt chamber 138, 148 in the first print head 130 and the second print head 140, respectively. The feed rollers 124 nip and feed the metal filament 134 such that the metal filament 134 is melted in the melt chamber 138 and then extruded from the first nozzle 132. Likewise, the feed rollers 124 nip and feed the ceramic filament 144 such that the ceramic filament 144 is melted in the melt chamber 148 and then extruded from the second nozzle 142.

The first print head 130 and the second print head 140 selectively deposit the metal composite material and the ceramic composite material, respectively, on the platen 150 to build successive layers and form a three-dimensional structure, as will be described further below. One or both of (i) the position and orientation of the platen 150 or (ii) the position and orientation of the print head carriage 120 and, more specifically, the first nozzle 132 of the first print head 130 and the second nozzle 142 of the second print head 140 are controlled by the 3D printer 100 to deposit the metal composite material and ceramic composite material in the desired location and direction. The print head carriage 120 and the platen 150 may be located in a print chamber 106, which in this embodiment is below the storage chamber 102. The print chamber 106 may be heated or otherwise have the atmosphere controlled as is suitable for the materials being deposited from the first nozzle 132 and the second nozzle 142 on to the platen 150.

The controller 110 controls the relative position of the first nozzle 132 and the second nozzle 142 relative to the platen 150 by suitable position and orientation control mechanisms. Such position and orientation control mechanisms include, for example, gantry systems, robotic arms, and/or H frames that incorporate electrical motors, hydraulic cylinders and motors/pumps, pneumatic cylinders and motors/pumps, and other actuators. In the embodiment shown in FIG. 2, for example, the print head carriage 120 is movably connected to a gantry system 126 and motors 128 move the print head carriage 120 in X and Y directions. The controller 110 is operatively coupled to the motors 128 to move the print head carriage 120 and, more specifically, the first nozzle 132 of the first print head 130 and the second nozzle 142 of the second print head 140 in the X and Y directions. Likewise, platen 150 is supported by an H-frame 152 in this embodiment and the height of the platen 150 is controlled by a motor 154 to adjust the relative position of the platen 150 to the print head carriage 120 in the Z direction. The controller 110 is operatively coupled to the motor 154 to control the height of the platen 150.

Although the movement of the apparatus has been described based on a Cartesian arrangement for relatively moving the print heads in three orthogonal translation directions, other arrangements are considered within the scope of, and expressly described by, a drive system or drive or motorized drive that may relatively move a print head and a build plate supporting a 3D printed object in at least three degrees of freedom (e.g., in four or more degrees of freedom as well). For example, for three degrees of freedom, a delta, parallel robot structure may use three parallelogram arms connected to universal joints at the base, optionally to maintain an orientation of the print head (e.g., three motorized degrees of freedom among the print head and build plate) or to change the orientation of the print head (e.g., four or higher degrees of freedom among the print head and build plate). As another example, the print head may be mounted on a robotic arm having three, four, five, six, or higher degrees of freedom; and/or the build platform may rotate, translate in three dimensions, or be spun.

The position and orientation control mechanisms (print head carriage 120 drive and platen 150 drive) may be equipped with position and/or displacement sensors. The controller 110 may be communicatively coupled to these sensors to receive an input from the sensors to monitor the relative position or velocity of the print head carriage 120 and, more specifically, the first nozzle 132 of the first print head 130 and the second nozzle 142 of the second print head 140 relative to the platen 150 and/or the layers of the object being constructed. The controller 110 may use sensed X, Y, and/or Z positions and/or displacement or velocity vectors to control subsequent movements of the first nozzle 132, the second nozzle 142, or platen 150. The 3D printer 100 may optionally include a laser scanner to measure distance to the platen 150 or the layer, displacement transducers in any of three translation and/or three rotation axes, distance integrators, and/or accelerometers detecting a position or movement of the first nozzle 132 and/or the second nozzle 142 to the platen 150.

In this embodiment, the controller 110 is a microprocessor-based controller that includes a processor 112 for performing various functions discussed herein, and a memory 114 for storing various data. The processor 112 may also be referred to as a central processing unit (CPU). In one embodiment, the various methods discussed below may be implemented by way of a series of instructions stored in the memory 114 and executed by the processor 112. The memory 114 may include read-only memory (ROM) and random-access memory (RAM), and the memory 114 may be communicatively coupled to the processor 112 by a bus. The controller 110 may also include communication devices 116 (e.g., input and output ports or receivers and transmitters) that allow the controller 110 to communicate with other devices using appropriate communication protocols. The controller 110 may also include a user interface 118 to receive inputs from a user of the 3D printer. The communication devices 116 and user interface 118 may be communicatively coupled to the processor 112 and the memory 114 by the bus.

Figure 3:
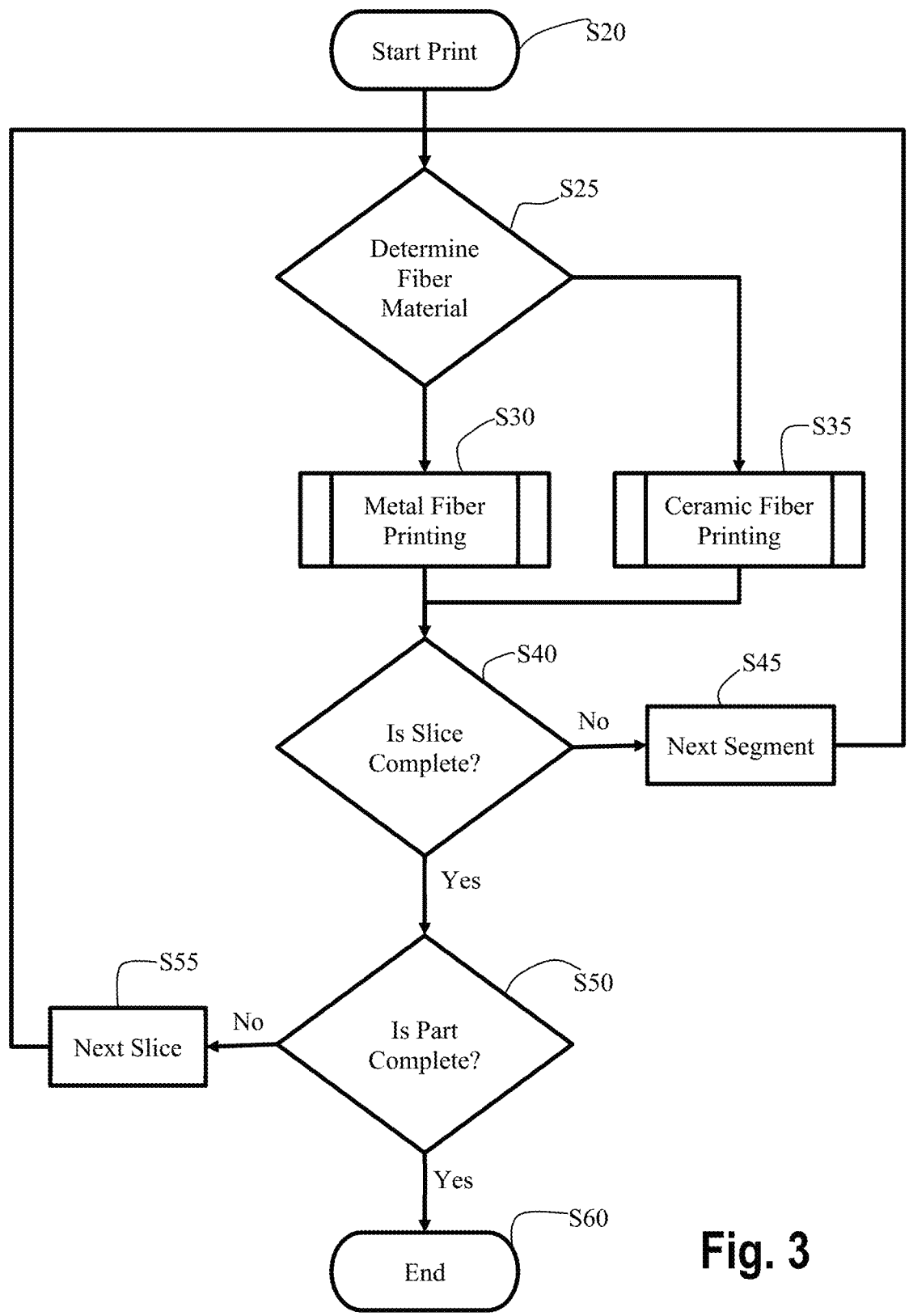
FIG. 3 is a flowchart showing a printing operation of the 3D printer shown in FIG. 2.

FIG. 3 is a flowchart showing a printing operation of the 3D printer 100 shown in FIG. 2, according to one embodiment. FIG. 3 describes, as a coupled functionality, control routines that may be carried out, alternately and in combination, to use the co-mounted FFF extrusion print heads 130, 140. A print file containing the part to be printed (or alternatively, a set of print commands) is input into the controller 110. The final part may be designed in a 3D computer aid drafting (CAD) program and then input into a suitable 3D print program, such as Eiger, produced by Markforged of Watertown, Massachusetts, to produce the print file. The 3D print program sizes the final part for printing by accounting for changes to the part during manufacturing (for example, shrinkage), adds one or more rafts 220 (see FIG. 4) and/or ceramic supports 230 (see FIG. 4) to form the part to be printed (including the supports), and then slices the part (as supported by the supports) into a plurality of layers ("slices") to create the print file. A "slice" is a single layer or lamina to be printed in the 3D printer, and a slice may include one segment or many segments, including segments of different materials. When printing is initiated in step S20, the controller 110 reads the print file (or set of print commands) and, in step S25, determines the stock material for the first segment of the first slice to be printed. "Segment" as used herein corresponds to "toolpath" and "trajectory", and means a linear row, road, or rank having a beginning and an end, which may be open or closed, a line, a loop, curved, straight, etc. A segment begins when the first print head 130 or second print head 140 begins a continuous deposit of material and terminates when the printhead stops depositing.

When the segment to be printed is metal, the process proceeds to the metal printing step (step S30), where the controller 110 moves and operates the first print head 130 to extrude the metal composite material from the first nozzle 132 and deposit the metal composite material on the platen 150 (for the first slice) or on a previous layer (for subsequent slices) in the manner discussed above. When the controller 110 determines that the segment to be printed is ceramic in step S25, the process proceeds to the ceramic printing step (step S35), where the controller 110 moves and operates the second print head 140 to extrude the ceramic composite material from the second nozzle 142 and deposit the ceramic composite material on the platen 150 (for the first slice) or on a previous layer (for subsequent slices) in the manner discussed above.

When the controller 110 finishes the segment, the controller 110 then determines if the slice is complete in step S40. If the slice is not complete, the controller 110 proceeds to the next segment in step S45 and the process returns to step S25 to determine the stock material used for the next segment. If the slice is complete, the controller 110 determines if the part is complete in step S50. If the part is not complete, the controller 110 proceeds to the next slice in step S55 and the process returns to step S25 to determine the stock material used for the first segment of the next slice. If the part is complete, the printing process ends in step S60. The part 210 (see FIG. 4) and support structures in the as-printed state may be referred to as green body 200 (see FIG. 4).

As shown in FIG. 1, the green part 210 (see FIG. 4) undergoes a debinding process in step S12 after the part is printed in step S10. The green body 200 is transferred to a debinding chamber (optionally, the debinding chamber is integrated in the 3D printer or vice versa). Debinding includes removing at least one binder component from the metal composite material using a thermal process, a solvent process, a catalysis process, or a combination of these, leaving a porous metal structure (brown part 210 which is part of a brown body 200). As discussed further below, the debinding process may first include a wash process (e.g., solvent debinding) followed by thermal debinding performed as part of a sintering process. In this multi-step debinding process, the part 210 after the wash process may be referred to as the brown part 210, and in such a case, the brown part 210 may be a porous metal-polymer structure.

In some embodiments, the binder used for both the metal composite material and the ceramic composite material includes a washable component (e.g., a polymer binder with a washable component) that may be removed by placing the green body 200 (see FIG. 4) into a solvent bath. The green body 200 may be submerged in the solvent bath for a period of time as the solvent is circulated to remove the dissolvable component of the polymer binder. When wax-like washable components of the binder are used, organic solvents are used. If the washable component of the binder is water-soluble, for example PEG, water could be used to dissolve the washable component of the binder.

In some embodiments, a thermal debinding processes may be used in addition to, or in lieu of, the solvent-based processes. Here, the green body 200 (or brown body 200 after solvent debinding) is heated to a temperature, using, for example, a furnace, to remove the binder. The non-washable binding component of the binder, for example, may be pyrolised with, in some cases, the assistance of catalyzing or other reactive agents in gas or otherwise flowable form.

After debinding in step S12, the brown body 200 (see FIG. 4) is sintered in step S14. The brown body is transferred to a sintering chamber or furnace (optionally combined with the printer and/or debinding chamber). The brown body 200 is brought to a sintering temperature suitable for the type of metal being used to form the part 210 (see FIG. 4) and powder size of the metal particulate. The brown part 210 is then sintered at the sintering temperature to form metallurgical bonds between the particles and allow the brown part 210 to densify to the final part density. During sintering, the brown part 210 uniformly shrinks by approximately 20%, closing internal porous structures in the brown body by, for example, atomic diffusion. Depending upon the metal used for the brown part 210, the atmosphere of the furnace may be appropriately controlled. Thermal debinding and sintering may be conducted in one continuous cycle inside one and the same furnace. In such a case, the brown body 200 is gradually heated from room temperature to sintering temperature and the thermal debinding process occurs during the gradual heating process.

Figure 4:
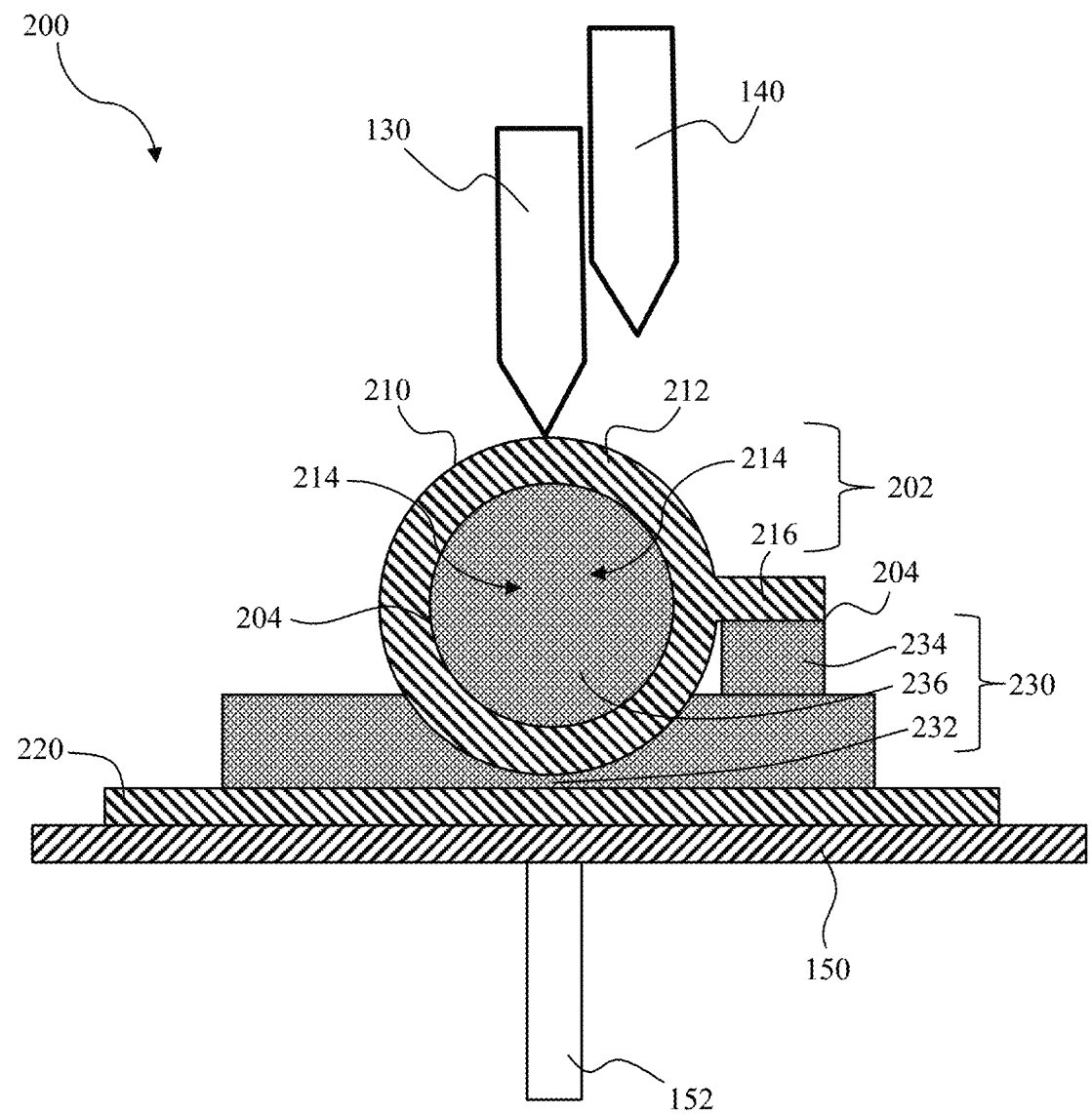
FIG. 4 is a cross-sectional view of a green body formed using the process shown in FIG. 3.

FIG. 4 is a cross-sectional view of the green body 200 on the platen 150 as the printing process is occurring. As noted above, the brown part 210 is porous and may have little to no binder holding the metal particulate together. Some portions of the brown part 210 are fragile and could collapse under their own weight or otherwise deform causing an undesired change in shape and dimensions of the brown part which would be carried through to the as-sintered part. Such portions are referred to herein as supportable portions 202 and include, for example, holes, cavities, and overhangs. The reference numerals for the parts shown in FIG. 4 are carried through during the process outlined in FIG. 1. For example, the green body 200 becomes the brown body 200 and then the sintered body 200, and in some cases the adjective will be removed to refer generically to the component (e.g., body 200).

The green body 200 includes the green part 210, which is a precursor to the final, as-sintered part. The green part 210 of this embodiment includes a cylindrical portion 212 with a hole 214 (or cavity) formed therein. The cylindrical portion 212 may be, for example, a metal tube. The green part 210 in this example also includes an overhang 216, such as a flange, protruding from an outer surface of the cylindrical portion 212.

The green part 210 is formed on a raft 220, and thus the green body 200 includes the raft 220. The raft 220 of this embodiment is a thin sheet of metal formed by using the metal composite material from the metal filament 134. The raft 220 forms a base on which the green part 210 may be formed and holds the green part 210 and the ceramic supports 230 (discussed below) in relative position during subsequent processing. In particular, being formed from the same metal composite material as the part 210, the raft 220 uniformly shrinks with the part 210 (brown part 210 during sintering) and provides a "shrinking platform" to hold the part 210 and related supports in relative position during the shrinking process.

The green body 200 includes supports that are used to support the supportable portions 202. The supports of the embodiments discussed herein are ceramic supports 230. The ceramic supports 230 are formed using the ceramic composite material from the ceramic filament 144 discussed above. In the example illustrated in FIG. 4, the ceramic supports 230 include a ceramic interface 232, outside supports 234, and inside supports 236. The ceramic interface 232 is provided between the raft 220 and the green part 210 and supports the bottom of the green part 210. Although shown with a thickness in FIG. 4, the ceramic interface 232 may be a thin layer between the raft 220 and the green part 210 with just enough thickness to allow easy separation of the part 210 and the raft 220 after sintering.

The outside supports 234 are ceramic supports 230 that are formed on the exterior of the green part 210 and are used to support supportable portions 202 on the outside of the part 210. In FIG. 4, an outside support 234 is shown supporting the overhang 216. The outside support 234 extends up from the raft 220 and supports the underside of the overhang 216. An interface 204 is formed between the portion of the outside support 234 that is in contact with the overhang 216.

The inside supports 236 are used inside the volume of a printed metal part 210. In this embodiment, the inside support 236 is located within the hole 214 of the part 210. The inside support 236 is thus formed on a bottom portion of the cylindrical portion 212 of the part 210. The inside support 236 of this embodiment thus supports and maintains the shape of the cylindrical portion 212 throughout the manufacturing process. The inside support 236 of this embodiment also includes an interface 204 where the inside support contacts the support, which in FIG. 4 is on the outside circumference of the inside support 236 and the inside surface of the cylindrical portion 212. Although only one outside support 234 and one inside support 236 are shown in FIG. 4, a plurality of the outside supports 234 and a plurality of the inside supports 236 may be used as needed based on the geometry of the part 210.

Using ceramic supports 230 is advantageous as they can be easily removed during post processing operations (see step S16 in FIG. 1). The ceramic chosen for the ceramic filament 144 preferably has a sintering temperature that is higher than the sintering temperature that will be used to sinter the metal particles (see step S14 in FIG. 1). As a result, the ceramic particles only undergo at most a small amount of bonding (necking) at contact points between ceramic particles during the sintering step (step S14). The ceramic particles are thus tacked together without significant densification and bonding during the sintering step (step S14). Likewise, the binder material of the ceramic composite material (ceramic filament 144) is also chosen so that it is removed during the debinding step (step S12 in FIG. 1). Preferably, the binder material within the ceramic composite (ceramic filament 144) is similar to, or even the same as, that of the binder material for the metal composite (metal filament 134). In some embodiments, the binder of the metal composite material and the binder of the ceramic composite material each include a primary component, and the primary component of the binder of the metal composite material is the same as the primary component of the binder of the ceramic composite material. The binder material may preferably contain a washable component that does not present a diffusion barrier during washing operations and is removed during the washing operation, similar to a binder material used within the metal composite (metal filament 134). As a result, the ceramic supports 230 after the sintering step (step S14) are unbound, unsintered material that can be easily removed. The outside supports 234 are easily crushable and can be, for example, finger-crushed without the use of tools to free the sintered part 210 from the raft 220. Similarly, the inside supports 236 are easily removed by, for example, scraping, shaking out, or washing out the inside support 236 after the sintering step. Such inside supports 236 can thus be employed in almost fully enclosed volumes that have only a small opening to shake out or wash out ceramic dust. Accordingly, the ceramic supports 230, particularly as used for the inside supports 236, are advantageous over other materials that can not be removed as easily because they melt or otherwise bond during the sintering temperatures used in the sintering step (step S14 in FIG. 1).

Using a ceramic, however, poses some challenges that need to be overcome. The ceramic composite material and ceramic filament 144 and the ceramic supports 230 discussed herein overcome such challenges. As noted above, the metal in the brown part 210 shrinks during sintering. In contrast, however, the ceramic supports 230 do not shrink in the same manner. Instead, the ceramic supports 230 are designed to have a strength during the sintering process such that the ceramic supports 230 are compliant. The brown part 210 applies a force to the ceramic supports 230, and the ceramic supports 230 selectively crack and/or gracefully fold to change in volume with the shrinking brown part 210. If the ceramic supports 230 are too strong, the ceramic supports 230 do not deform with the brown part 210 preventing the part 210 from achieving the desired shape and, in some cases, causing defects in the as-sintered part 210. Accordingly, the ceramic supports 230 used herein have a strength to support the supportable portions 202 prior to sintering and are deformable so as to allow the supportable portions 202 to undergo geometric changes during sintering.

Instead of being a solid structure, the ceramic support 230 is formed having an infill 238 formed from a plurality of infill supports 240 (see FIGS. 5A-5H). The infill supports 240 are formed by the ceramic filament 144 being deposited a pattern to form the infill supports 240. Different morphologies (geometries/patterns) may be used for the infill 238. One factor used to achieve the desired strength of the ceramic supports 230 is the morphology of the infill 238 used to form the ceramic support 230. Various suitable infill patterns are shown, for example, in FIGS. 5A-5H.

Figure 5A:
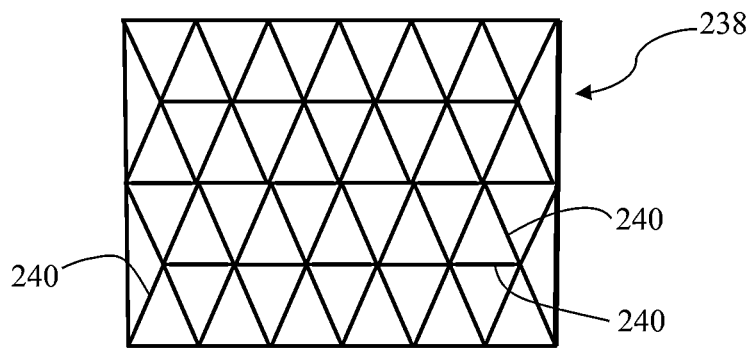
FIGS. 5A-5H show infill patterns for a ceramic support used with the method shown in FIG. 1.

FIG. 5A shows a plan view of an infill 238 of the ceramic support 230 having a vertical triangular prism morphology. The triangular prism morphology may be used as the infill 238 for the ceramic support 230, particularly when a relatively high rigidity for the ceramic support 230 is desired. The triangular prisms are relatively rigid (stiff and strong) compared to other morphologies. If decreased rigidity is desired, the use of a triangular prism may provide undesirably high levels of rigidity, which may cause cracks or distortions in the sintered metal part 210. Nonetheless, the triangular prism morphology may be used, for instance, with a larger size for the triangular prisms, which provides a relatively lower resultant density. Preferably, the lowest support density possible for a given part geometry is used. For example, a thin-walled tube may use a support density of 5%, and a thick-walled tube may use a support density of 15%. The infill density is the percentage of space occupied by the infill 238 or, more specifically, the infill supports 240. In such cases, however, the support density may be too large for printing adequate quality overhangs 216 or other supportable portions 202, as the larger the cell size, the larger space unsintered metal material needs to span without a support. Thus, other morphologies may be used.

Figure 5B:
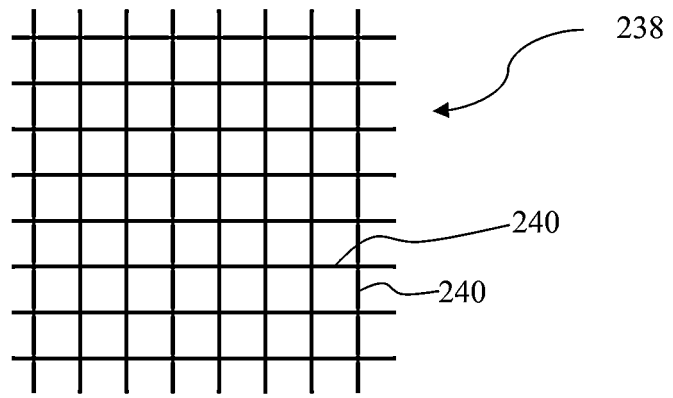

FIG. 5B shows a plan view of an infill 238 of the ceramic support 230 having an orthogonal grid support morphology. The orthogonal grid support morphology may be less stiff compared to triangular prisms and in some instances, may provide a good compromise between support density (cell size) and stiffness. The orthogonal grid support morphology allows for smaller cell size (higher support density), while maintaining a lower stiffness of the overall ceramic support 230 compared to the same density of triangular prisms in the ceramic support 230. For example, a thin-walled tube may use a support density of 10%, and a thick-walled tube may use a support density of 20%, as compared to 5% and 15%, respectively, for the triangular support morphology discussed above.

Figure 5C:
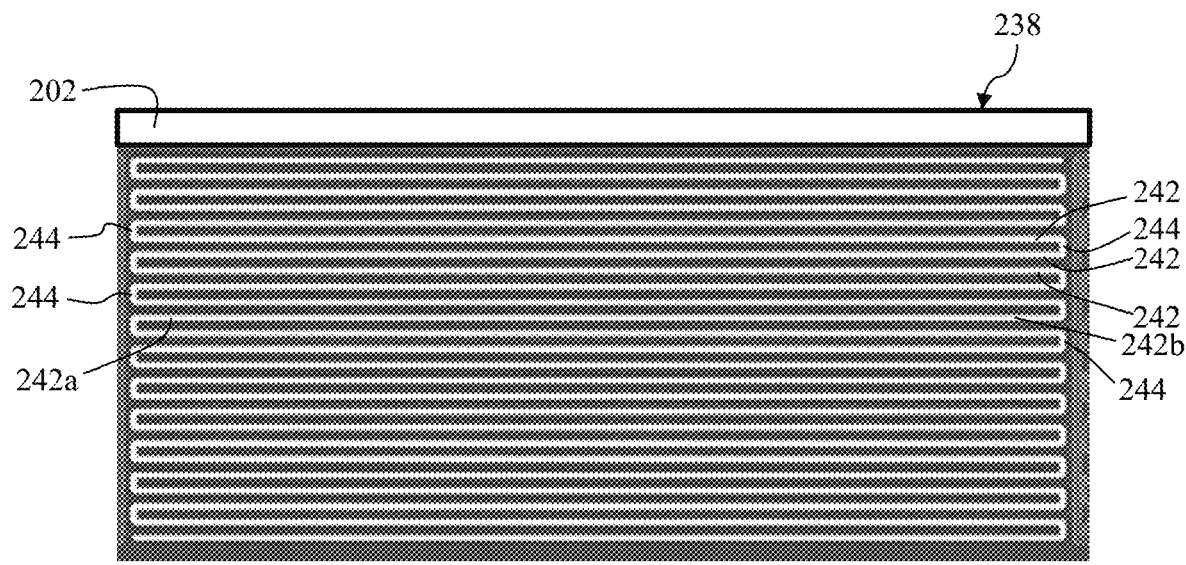
Figure 5D:
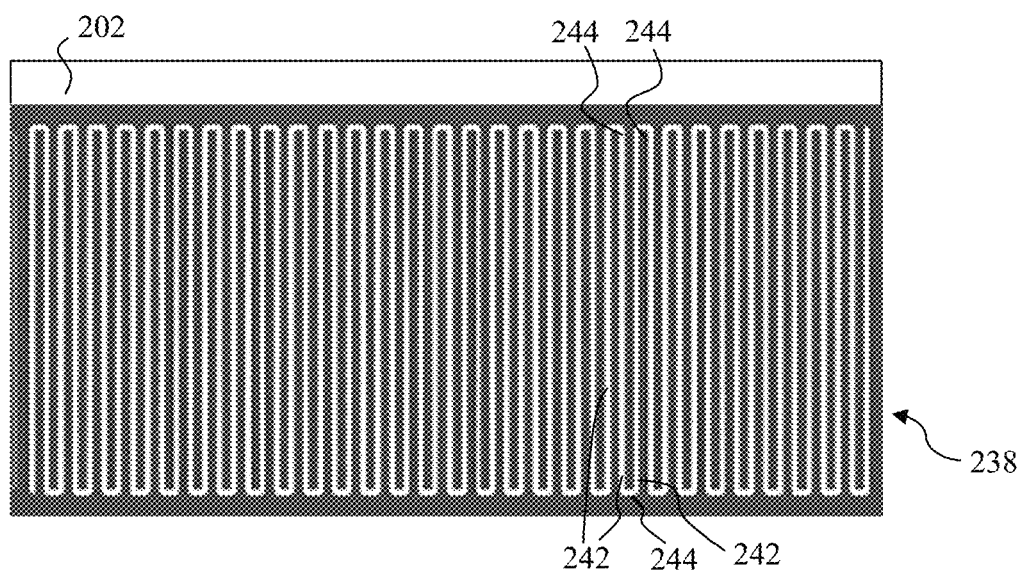
Figure 5E:
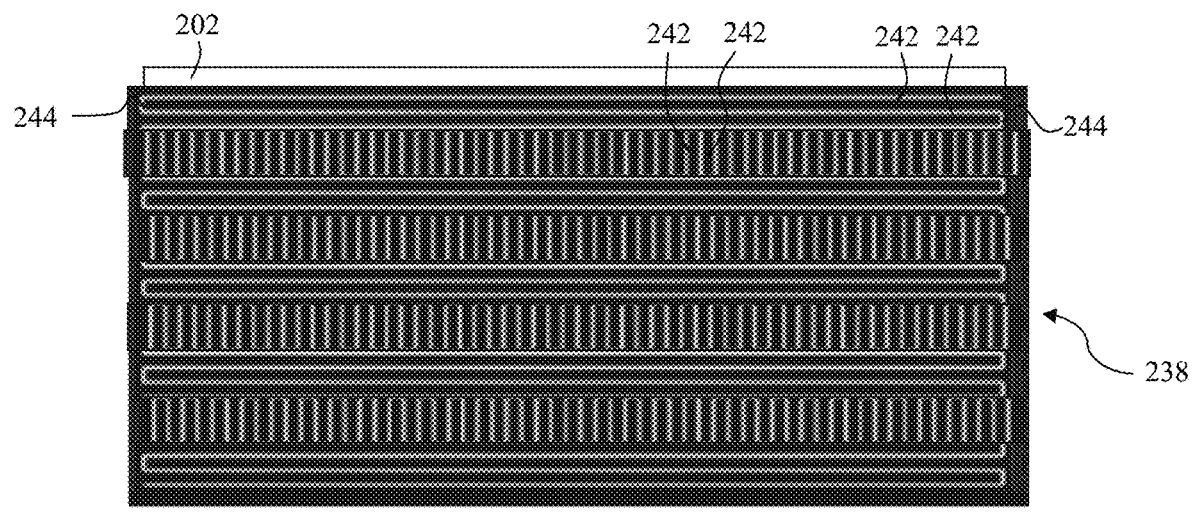

Another such geometry that may be used for the infill 238 of the ceramic support 230 is an accordion support morphology. FIGS. 5C-5E show plan views of infills 238 of the ceramic support 230 having accordion support morphologies. The accordion support morphology includes a plurality of parallel supports 242. With the exception of the support at each end, each parallel support 242 is connected to an adjacent parallel support 242 by a connecting support 244. Each parallel support 242 includes a first end 242a and a second end 242b, the first end 242a is connected to a first adjacent parallel support 242 and the second end 242b is connected to the other (second) adjacent parallel support 242. In FIG. 5C, the parallel supports 242 are parallel to the supportable portion 202, and in FIG. 5D, the parallel support 242 are perpendicular to the supportable portion 202. FIG. 5E shows a combination of the orientations discussed in FIGS. 5C and 5D. One or more parallel supports 242 are printed in the parallel configuration (FIG. 5C), then one or more of the parallel supports 242 are printed in the perpendicular configuration (FIG. 5D). This pattern may then be alternated. In this example, three parallel supports 242 are printed in the parallel configuration (FIG. 5C), and then an equivalent height to three parallel supports 242 is printed in the perpendicular configuration (FIG. 5D). An advantage of the accordion support morphology is that the direction and infill density can be tailored based on the compliance desired in the ceramic support 230.

Figure 5F:
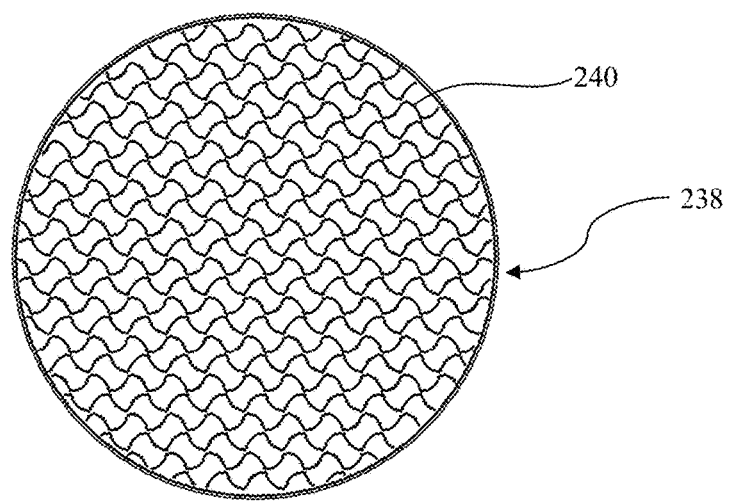

FIG. 5F is a perspective view of an infill 238 of the ceramic support 230 having gyroid support morphology. A gyroid support morphology is an example of an organic support morphology. The gyroid support provides isotropic support and is even less stiff compared to the orthogonal grid support morphology (FIG. 5B). Thus, the gyroid support morphology, allows even denser infill supports 240 (smaller cell size), while providing a lower overall stiffness of the ceramic support 230.

Figure 5G:
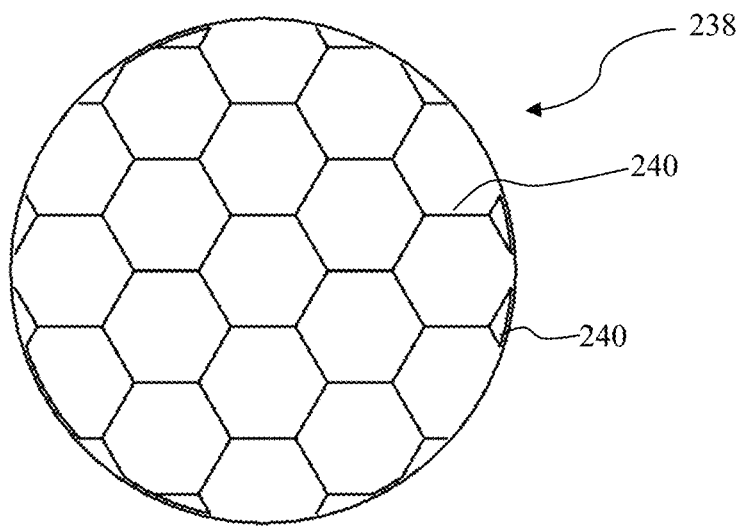
Figure 5H:
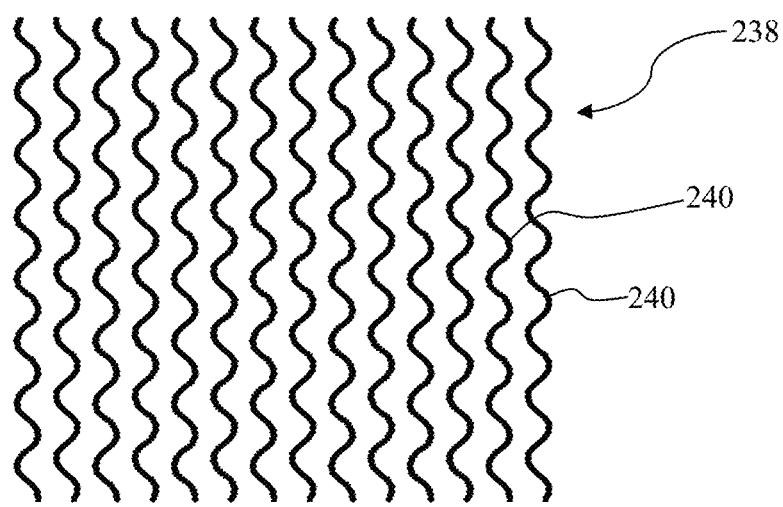

Although certain morphologies are for the infill 238 are explicitly shown and described above, any suitable geometry may be used, including for example, a hexagonal geometry, a sinusoidal geometry, spline line geometry, or any other continuous or discontinuous line geometry. FIG. 5G shows a plan view of an infill 238 of the ceramic support 230 having a hexagonal support morphology. FIG. 5H shows a plan view of an infill 238 of the ceramic support 230 having a sinusoidal support morphology.

As noted above, the lowest support density possible for a given part geometry is preferably used for the infill 238 of the ceramic support 230. The support density may be, for example, from 1% to 50%. When the ceramic support 230 has an infill 238 with a triangular geometry, as shown in FIG. 5A, the support density preferably may be, from 1% to 15%. When the ceramic support 230 has an infill 238 with an orthogonal geometry, as shown in FIG. 5B, the support density preferably may be, from 1% to 20%. When the ceramic support 230 has an infill 238 with an accordion geometry, as shown in FIGS. 5C-5E, the support density preferably may be, from 1% to 25%. When the ceramic support 230 has an infill 238 with a gyroid geometry, as shown in FIG. 5F, the support density preferably may be, from 1% to 30%. When the ceramic support 230 has an infill 238 with a hexagonal geometry, as shown in FIG. 5G, the support density preferably may be, from 1% to 20%. When the ceramic support 230 has an infill 238 with a sinusoidal geometry, as shown in FIG. 5H, the support density preferably may be, from 1% to 30%. When the ceramic support 230 has an infill 238 with a spline line geometry, the support density preferably may be, from 1% to 25%.

Another factor impacting the strength, and thus the compliance of the ceramic support 230 is the particle size of the ceramic particulate used in the ceramic filament 144. Even though the sintering times and temperatures used in the sintering step (step S14) do not provide full bonding of the ceramic particles, some bonding may occur. The finer the particles are, the denser the as-sintered ceramic support 230 will become, as there is more bonding overall of ceramic material. Smaller particles sizes of the ceramic particulate thus results in stronger ceramic supports 230. In a similar manner, the higher the sintering temperature, the more bonding occurs between particles and the stronger the resultant strength of the ceramic support 230 will become. If ceramic particles are too fine, while the sintering temperature is too high, the ceramic support 230 might be overly sintered and become too strong to gracefully fold and fail as the metal part shrinks, causing defects in the sintered metal part 210. For example, nanoparticles could sinter into a too-strong compact even at temperatures as low as 1000° C., while a shape consisting of 100 µm particles would remain weak even after sintering at 1400° C. Preferably the average size of the ceramic particle is from 0.1 µm to 100 µm, more preferably from 0.1 µm to 25 µm, and even more preferably from 0.1 µm to 10 µm for a sintering temperature from 1000° C. to 1400° C.

As discussed above, the ceramic composite material and, more specifically, the ceramic filament 144 is used to form the ceramic support 230. After the washing process (solvent debinding in step S12 of FIG. 1), the ceramic support 230 should support its own weight and the weight of the supportable portions 202. Thus, the volumetric ratio of the ceramic to binder within the ceramic filament 144 is another factor to consider. Using a ceramic filament 144 with a low volumetric ratio (percentage of ceramic particulate in the ceramic filament 144), may result in the ceramic material failing to support its own weight as the brown ceramic support 230 or that of the supportable portions 202 once the binder is removed. This limits the use of ceramic as a support material. Such low volumetric ratio filaments include ceramic filaments 144 with, for example, 25% loading of spherical alumina powder by volume fraction in a thermoplastic (e.g., polypropylene) matrix. Instead, the volumetric ratio of the ceramic filaments 144 is preferably those discussed below, as they have been found to provide suitable support.

Another factor to consider is the coefficient of thermal expansion (CTE) of the metal composite material (metal filament 134) and the ceramic composite material (ceramic filament 144). A mismatch in the CTE of the metal filament 134 and the ceramic filament 144 may also lead to cracking. Ceramic filaments 144 with a relatively low volumetric ratio of ceramic to binder (such as the example above) may produce mismatch issues in CTE. Low volumetric loading of ceramic particulate in the ceramic filament 144 may be too low to constrain high CTE expansion of the binder. For example, 25% loading of spherical alumina powder by volume fraction in a polypropylene matrix may be too low to constrain high CTE expansion of polypropylene, which varies between 100 and 200 ppm/° C. (i.e., a quantity that is insufficient to effectively constrain plastic matrix CTE). As noted above, binder may still be present during stages when the ceramic support 230 is heated, resulting in thermal expansion of the ceramic support 230 and cracking of the part 210 if there is a CTE mismatch. For example, certain ceramic filament 144 may lack a binder with a washable component, such as a wax component. As a result, during a washing operation, the ceramic can present a barrier to solvent diffusion and incomplete washing of the adjacent metal material. Additionally, after the washing operation, the resulting ceramic may contain an undissolved polymer, which may increase the CTE and elevate a risk of cracking of adjacent mismatched parts as the temperature rises during thermal debinding and sintering.

To avoid the CTE mismatch issues discussed above, the ceramic filament 144, preferably, has a CTE that is substantially similar the CTE of the metal filament 134. That is, the deposited ceramic composite material and the deposited metal composite material have similar (or matching) CTE after the washing operation is performed. A similar CTE may be a CTE within 50% of the CTE of the one of the metal composite material or ceramic composite material with a higher CTE and, more preferably within 25% of the CTE of the one of the metal composite material or ceramic composite material with a higher CTE. For example, the CTE of steel is about 12 ppm/° C. and the CTE of alumina (ceramic) is about 8 ppm/° C. The CTE of a ceramic filament 144 using 25% by volume alumina ceramic particles would be much larger than the CTE of the metal filament 134 using steel particles (e.g., 60% by volume steel), but a ceramic filament 144 using 60% by volume alumina ceramic particles would be much closer to the CTE of the metal filament 134 using steel particles.

The ceramic loading of the ceramic filament 144 may vary, depending upon the ceramic and polymer combination selected. In general, the volumetric loading is selected so that viscosity of the molten ceramic filament 144 stays within 50 Pa to 500 Pa at 100 s$^{-1}$ shear rate. Such a viscosity enables the ceramic composite material to be printed using FFF-type printer, as discussed above. In view of the aforementioned considerations, the ceramic loading of the deposited ceramic composite material and ceramic stock material (e.g., the ceramic filament 144) is preferably from 40% to 70%, more preferably from 55% to 65%, and even more preferably from 58% to 62%.

Using the considerations discussed above regarding ceramic particle loading, particle sizes, and geometry of the infill 238, the ceramic support 230 can be designed to be compliant when the brown body 200 undergoes sintering. The infill 238 of the ceramic support in the interface portion is deformable to allow the shrinkage and other movement of the supportable portions 202 during sintering, as individual infill supports 240 may elastically deform or plasticly deform to allow the supportable portions 202 to undergo geometric changes. In some embodiments, infill supports 240 of the infill are positioned and designed to intentionally fail upon sufficient force being imparted thereon. For instance, the force imparted on such infill supports 240, e.g., when the supportable portions 202 undergoes geometric changes during sintering, may produce a stress that exceeds the failure strain of the ceramic infill supports 240, thus allowing intentional selective failure of the infill supports 240 and a change in the volume of the ceramic support 230. The rigidity, strength and other factors discussed above are preferably designed such that the stress occurring between the ceramic support and the supportable portion avoids cracking and/or other defects in the metal as the metal part 210 undergoes geometric changes during sintering.

Figures 6, 7A:
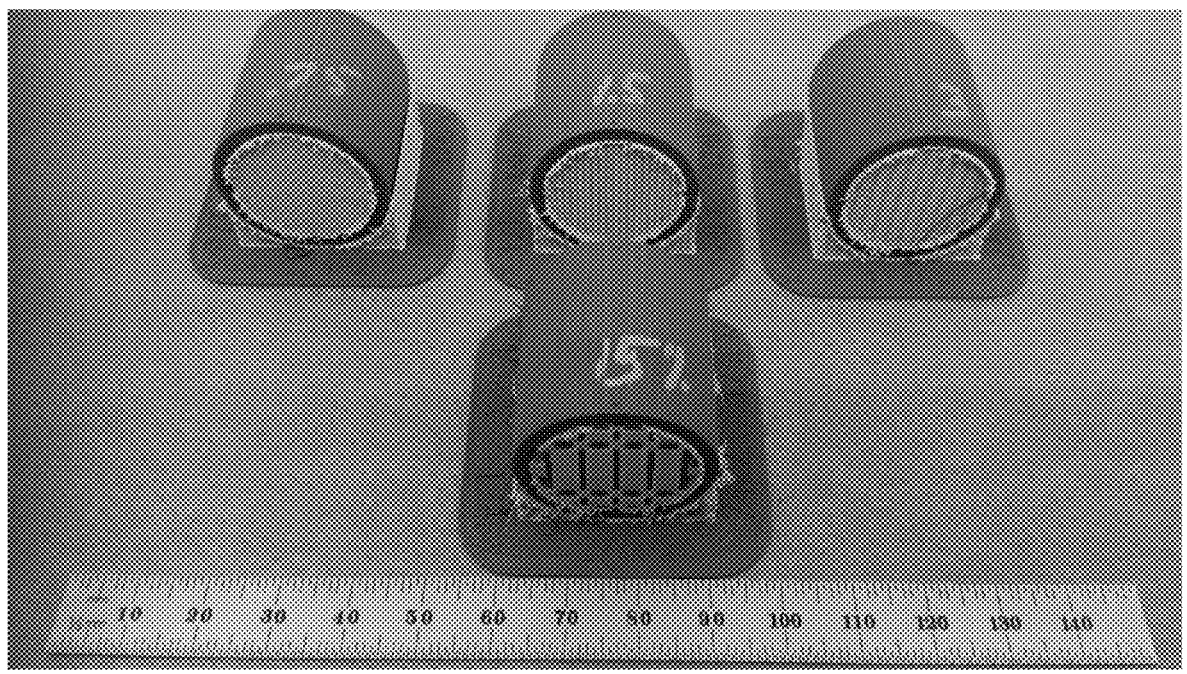
FIG. 6 is an image of four example tubes in an as-printed condition.
FIGS. 7A-7D are end views of the example tubes shown in FIG. 6 in an as-sintered condition. The example tube shown in FIG. 7A has an interior ceramic support with a triangular geometry used for the infill. The example tubes shown in FIGS. 7B-7D have interior ceramic supports with an accordion geometry used for the infill. The step size for the infill geometry is 0.75 in FIG. 7B, the step size for the infill geometry is 1.5 in FIG. 7C, and the step size for the infill geometry is 3.0 in FIG. 7D.

FIG. 6 shows four examples of a metal part printed according to methods discussed herein. The metal part printed in these examples was a metal tube having an outer diameter of 25 mm and a wall thickness of 2 mm. Each example tube was 25 mm long. The metal used to form the tube was 17-4 stainless steel. The ceramic supports, specifically the ceramic support formed on the interior of the tube (interior support), was formed using spherical alumina particles having an average diameter of 5 micrometers. The volume fraction of the ceramic particles in the ceramic filament was about 60%. Each of these examples use different infill geometries of the ceramic supports. Example 1, depicted at the bottom of FIG. 6 and marked as "15%", used a triangular infill geometry, similar to the geometry shown in FIG. 5A. The other three examples (Examples 2-4), depicted at the top of FIG. 6, used an accordion infill geometry, similar to the geometry shown in FIG. 5C. To form the accordion geometries, each next layer wall was printed at 90 degrees to previous layer walls. The distance between successive layer walls may be referred to as a step size. Each of these different accordion geometries had a different step size: a step size of 0.75 mm (Example 2, depicted at the top-left of FIG. 6); a step size of 1.5 mm (Example 3, depicted at the top-center); and a step size of 3.0 mm (Example 4, depicted at the top-right). Each of these examples was printed as discussed above. Subsequent to the printing, the example tubes were washed and sintered according to the methods discussed herein, and the results are shown in FIGS. 7A-7D.

FIG. 7A is an end view of the Example 1 tube with the triangular infill geometry in the as-sintered condition. The infill density was 15% in this example. The resulting example tube, after sintering, is visibly distorted. The ceramic support was removed, and the outer diameter vertical and horizontal diameters were measured. The vertical outer diameter was measured at 25.25 mm and the horizontal outer diameter was measured at 23.45 mm, a difference of 7%.

Figure 7B:
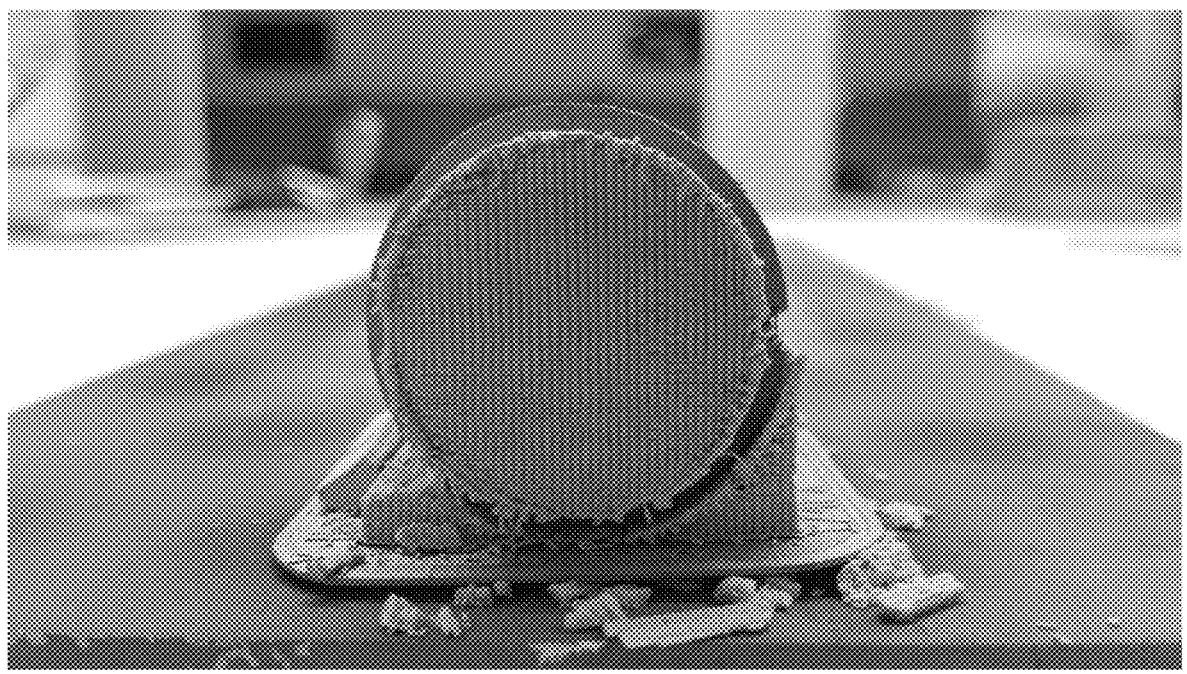

FIG. 7B is an end view of the Example 2 tube with an accordion infill geometry having a step size of 0.75 mm in the as-sintered condition. This step size results in an infill that appears practically as a monolith. The resulting example tube, after sintering, cracked.

Figure 7C:
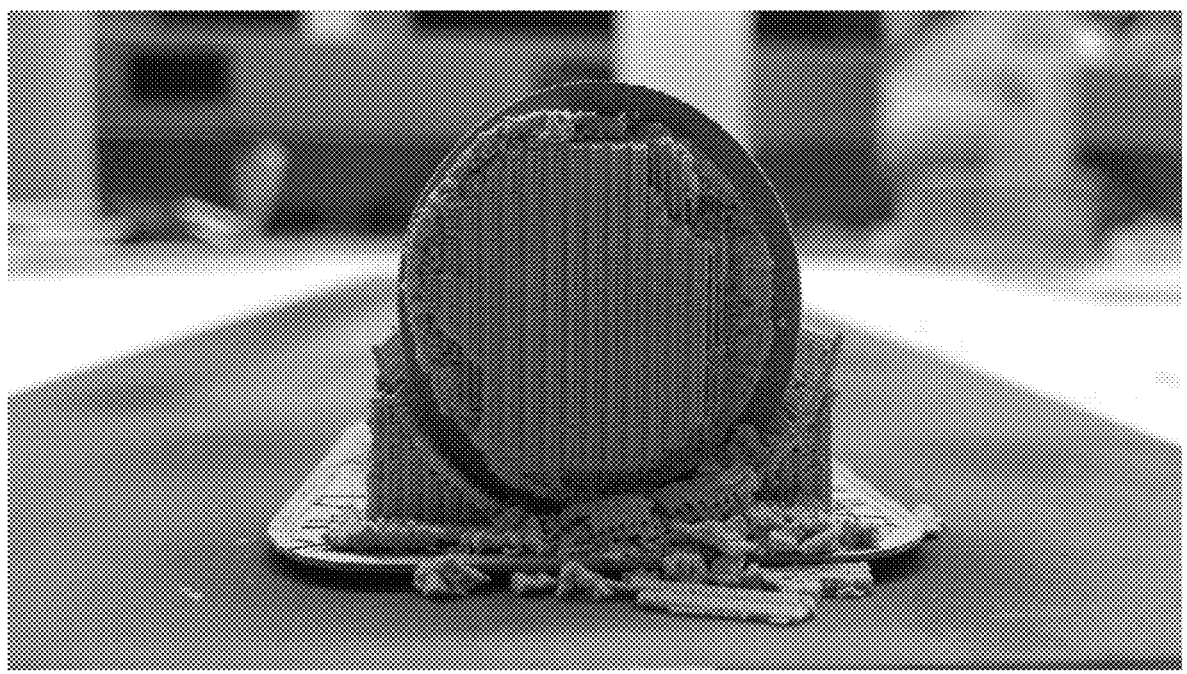

FIG. 7C is an end view of the Example 3 tube with an accordion infill geometry having a step size of 1.5 mm in the as-sintered condition. The resulting example tube, after sintering, is visibly distorted but did not crack. The ceramic support was removed, and the outer diameter vertical and horizontal diameters were measured. The vertical outer diameter was measured at 26.21 mm and the horizontal outer diameter was measured at 24.16 mm, a difference of 8%.

Figure 7D:
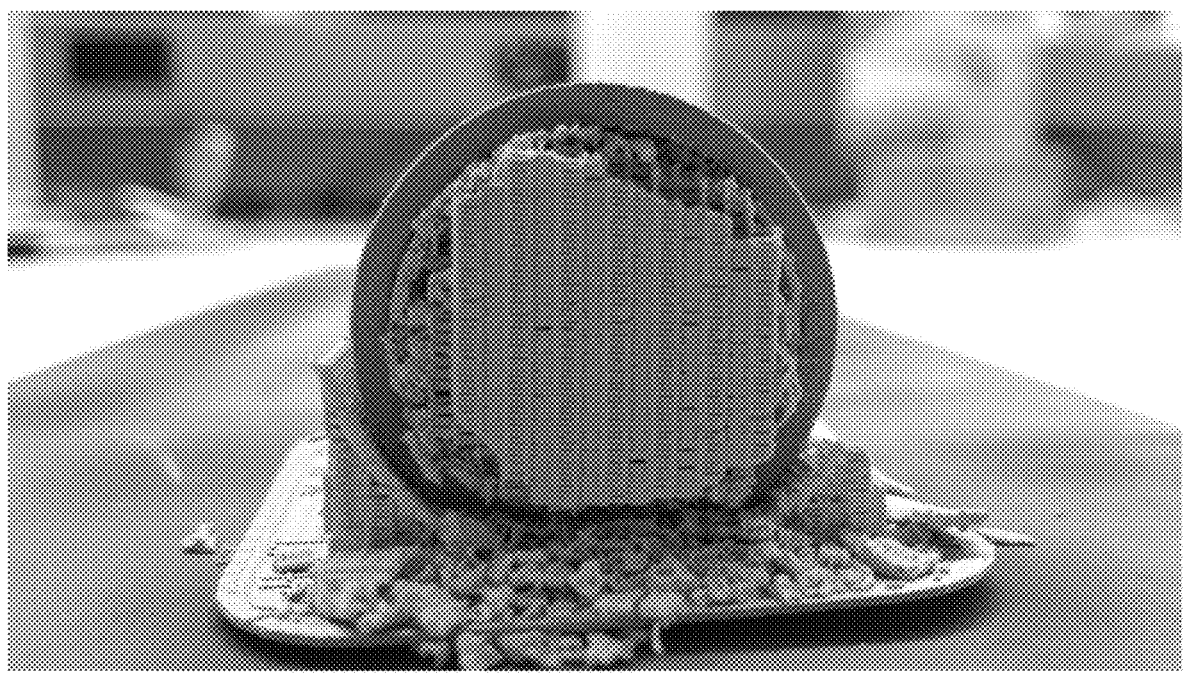

FIG. 7D is an end view of the Example 4 tube with an accordion infill geometry having a step size of 3.0 mm in the as-sintered condition. The resulting example tube, after sintering, is not visibly distorted and did not crack. The ceramic support was removed, and the outer diameter vertical and horizontal diameters were measured. The vertical outer diameter was measured at 24.67 mm and the horizontal outer diameter was measured at 24.12 mm, a difference of 2%. The infill density of the accordion infill geometry having a step size of 3.0 mm is about 12%, which is noticeably denser than the triangular infill geometry, discussed above. Nevertheless, the inventors surprisingly found that the accordion infill geometry produced a sintered tube with close dimensions and without failure (cracking), even when compared to other infills with a lower infill density (e.g., the triangular geometry). Without intending to be bound to any theory, the accordion infill geometry was a more compliant infill structure than the relatively stiff triangular geometry.

Figure 8:
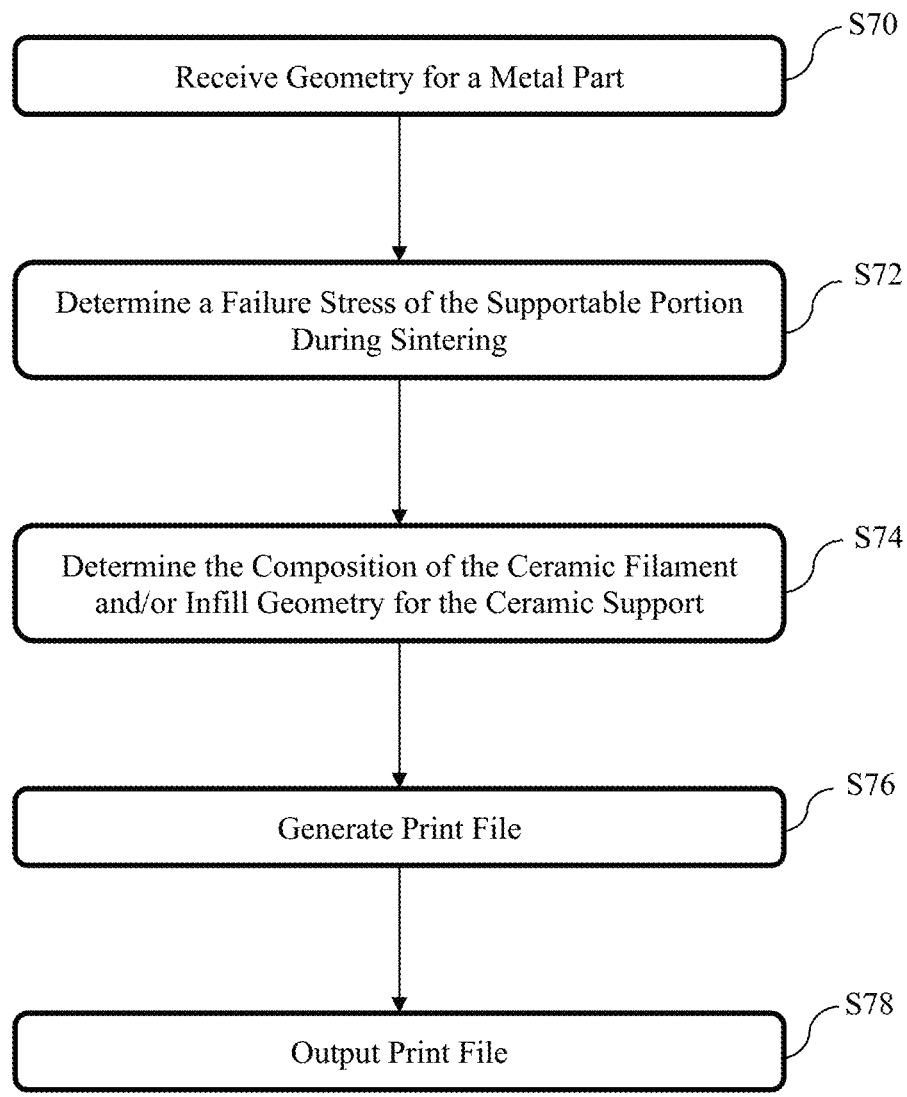
FIG. 8 is a flow chart for a method of determining a ceramic support structure according to an embodiment of the present invention.

Another aspect of the invention is a method of determining a ceramic support structure of the ceramic supports 230 for the metal part 210 including a supportable portion 202 to be produced as discussed above. FIG. 8 is a flow chart for a method of determining a ceramic support structure according to an embodiment of the present invention. The method discussed herein is a computer implemented method that may be implemented using the general-purpose computer 700 discussed below with reference to FIG. 9, operating a suitable 3D print program, such as Eiger, as discussed above. The method includes receiving, in step S70, a geometry for a metal part, such as a file produced by a computer aided drafting program, as discussed above. The method also includes determining, in step S72, a failure strain of the supportable portion 202 during sintering (step S14 in FIG. 1) of the metal part 210. The failure stress may be determined by first determining a failure strain of the supportable portion 202 and from the failure strain calculating the failure stress. The process then moves to step S74 to determine at least one of (i) a composition of the ceramic filament 144 used to produce the ceramic support 230 to support the supportable portion 202 and (ii) a geometry of an infill 238 of the ceramic support 230, based on the considerations discussed above. In step S76, the print file is generated, as discussed above, by slicing and segmenting the part to be printed. The print file generated in step S76 includes the ceramic support 230 based on the determinations made in step S76. In step S78, the print file is then output to be used in the printing process discussed above. The print file thus includes machine readable instructions that can be executed by the controller 110 as discussed above to produce the green body 200 including the ceramic support 230.

Figure 9:
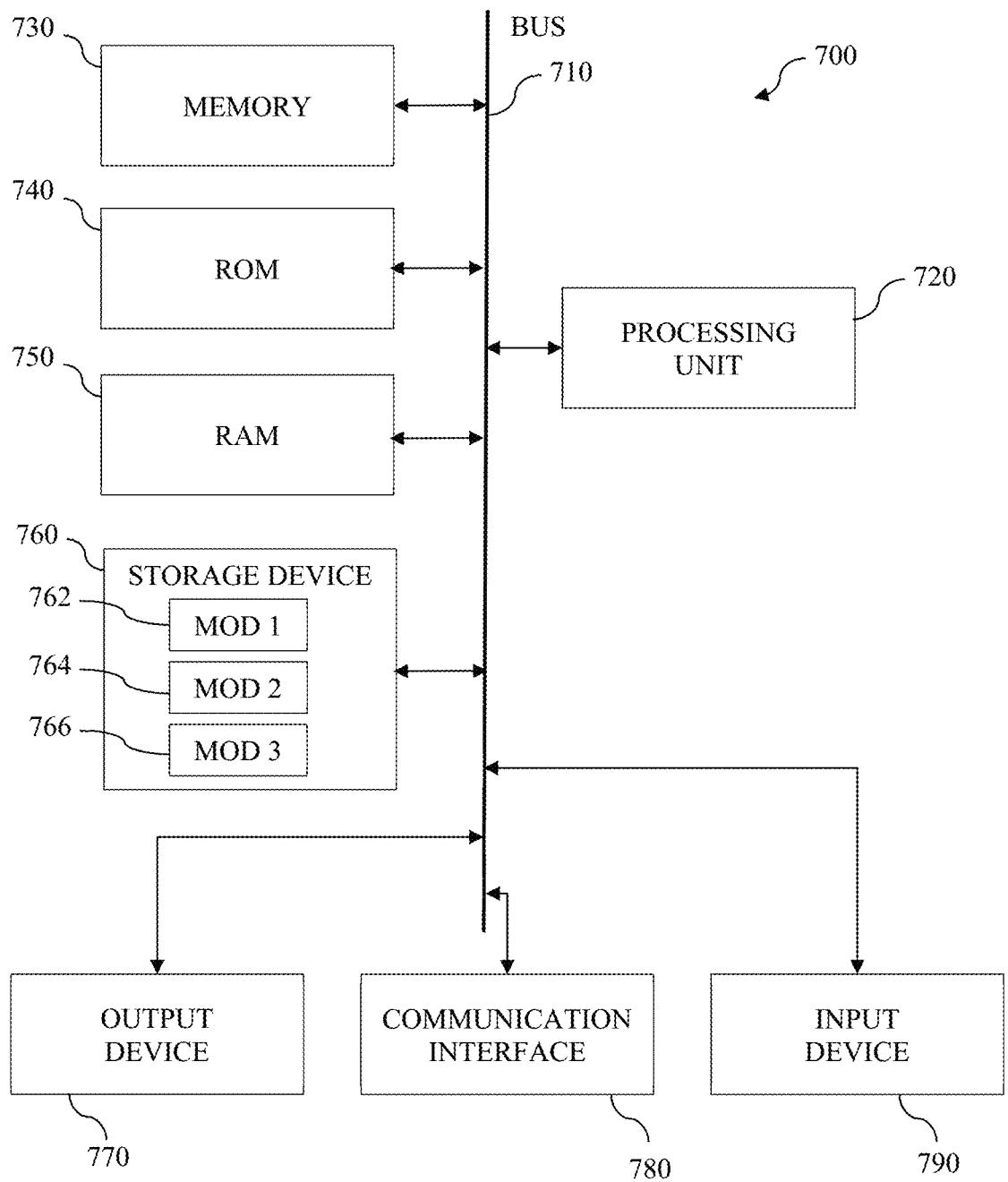
FIG. 9 is a schematic of a general-purpose computing device.

FIG. 9 shows a general-purpose computing device 700 (system) that may be used to implement the methods discussed herein. The general-purpose computing device 700 shown in FIG. 9 includes a processing unit (also known as a CPU or processor) 720 and a system bus 710 that couples various system components including the system memory 730, such as read-only memory (ROM) 740 and random-access memory (RAM) 750 to the processor 720. The computing device 700 can include a cache of high-speed memory connected directly with, in close proximity to, or integrated as part of the processor 720. The computing device 700 copies data from the memory 730 and/or the storage device 760 to the cache for quick access by the processor 720. In this way, the cache provides a performance boost that avoids processor 720 delays while waiting for data. These and other modules can control or be configured to control the processor 720 to perform various actions. Other system memory 730 may be available for use as well. The memory 730 can include multiple different types of memory with different performance characteristics. It can be appreciated that the disclosure may operate on a computing device 700 with more than one processor 720 or on a group or cluster of computing devices networked together to provide greater processing capability. The processor 720 can include any general-purpose processor and a hardware module or software module, such as module 1 762, module 2 764, and module 3 766 stored in storage device 760, configured to control the processor 720, as well as a special-purpose processor where software instructions are incorporated into the actual processor design. The processor 720 may essentially be a completely self-contained computing system, containing multiple cores or processors, a bus, memory controller, cache, etc. A multi-core processor may be symmetric or asymmetric.

The system bus 710 may be any of several types of bus structures, including a memory bus or memory controller, a peripheral bus, and a local bus using any of a variety of bus architectures. A basic input/output (BIOS) stored in ROM 740 or the like may provide the basic routine that helps to transfer information between elements within the computing device 700, such as during start-up. The computing device 700 further includes storage devices 760 such as a hard disk drive, a magnetic disk drive, an optical disk drive, tape drive or the like. The storage device 760 can include software modules 762, 764, 766 for controlling the processor 720. Other hardware or software modules are contemplated. The storage device 760 is connected to the system bus 710 by a drive interface. The drives and the associated computer-readable storage media provide nonvolatile storage of computer-readable instructions, data structures, program modules, and other data for the computing device 700. In one aspect, a hardware module that performs a particular function includes the software component stored in a tangible computer-readable storage medium in connection with the necessary hardware components, such as the processor 720, bus 710, output device 770, and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the computing device 700 is a small, handheld computing device, a desktop computer, or a computer server.

Although the exemplary embodiment described herein employs hard disk as the storage device 760, other types of computer-readable media which can store data that are accessible by a computer, such as magnetic cassettes, flash memory cards, digital versatile disks, cartridges, random access memories (RAMs) 750, and read-only memory (ROM) 740, may also be used in the exemplary operating environment. Tangible computer-readable storage media, computer-readable storage devices, or computer-readable memory devices expressly exclude media such as transitory waves, energy, carrier signals, electromagnetic waves, and signals per se.

To enable user interaction with the computing device 700, an input device 790 represents any number of input mechanisms, such as a microphone for speech, a touch-sensitive screen for gesture or graphical input, keyboard, mouse, motion input, speech, and so forth. An output device 770 can also be one or more of a number of output mechanisms known to those of skill in the art. In some instances, multimodal systems enable a user to provide multiple types of input to communicate with the computing device 700. The communications interface 780 generally governs and manages the user input and system output. There is no restriction on operating on any particular hardware arrangement, and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although this invention has been described with respect to certain specific exemplary embodiments, many additional modifications and variations will be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. A method of manufacturing a metal part, comprising:
   depositing a metal composite material in a pattern to form layers of the metal part, the metal composite material including sinterable metal particles, the metal part including a supportable portion; and
   depositing a ceramic composite material to form a ceramic support for the metal part, the ceramic support being deposited in a position to support the supportable portion and be in contact with the supportable portion, the ceramic composite material having a strength to support the supportable portion prior to sintering and being deposited in a geometry that is deformable by the supportable portion to allow the supportable portion to undergo geometric changes during sintering.

2. The method of claim 1, wherein the ceramic support is deformable during sintering by a portion of the ceramic support exceeding its failure strain.

3. The method of claim 1, wherein the ceramic composite material is deposited in a pattern to form infill supports for the ceramic support.

4. The method of claim 3, wherein the infill supports are deposited in a pattern that is one of a triangular geometry, an orthogonal geometry, an accordion geometry, or a gyroid geometry.

5. The method of claim 1, wherein the ceramic composite material includes ceramic particles having an average particle size from 0.1 µm to 100 µm.

6. The method of claim 5, wherein the ceramic composite material includes ceramic particles having an average particle size from 0.1 µm to 25 µm.

7. The method of claim 5, wherein the ceramic composite material includes ceramic particles having an average particle size from 0.1 µm to 10 µm.

8. The method of claim 5, further comprising sintering the metal part with the ceramic support supporting the supportable portion, wherein the sintering temperature is from 1000° C. to 1400° C.

9. The method of claim 1, wherein the ceramic composite material includes ceramic particles, the ceramic particles comprising alumina, magnesia, zirconia, yittria, silicon carbide, mullite, silicon nitride, aluminum nitride, boron carbide, or combinations thereof.

10. The method of claim 1, wherein the ceramic composite material includes ceramic particles and a binder.

11. The method of claim 10, wherein the ceramic particles are from 40% to 70% by volume of the ceramic composite material.

12. The method of claim 11, wherein the ceramic particles are from 55% to 65% by volume of the ceramic composite material.

13. The method of claim 11, wherein the ceramic particles are from 58% to 62% by volume of the ceramic composite material.

14. The method of claim 10, wherein the metal composite material includes metal particles and a binder.

15. The method of claim 14, wherein the binder of the metal composite material and the binder of the ceramic composite material each include a primary component, the primary component of the binder of the metal composite material being the same as the primary component of the binder of the ceramic composite material.

16. The method of claim 14, further comprising exposing the metal part with the ceramic support supporting the supportable portion to a thermal process, wherein each of the metal composite material and the ceramic composite material has a coefficient of thermal expansion when exposed to the thermal process, the coefficient of thermal expansion of the ceramic composite material being within 50% of the coefficient of thermal expansion of the metal composite material.

17. The method of claim 16, wherein the coefficient of thermal expansion of the ceramic composite material being within 25% of the coefficient of thermal expansion of the metal composite material.

18. The method of claim 16, wherein the thermal process is thermal debinding.

19. The method of claim 18, further comprising sintering the metal part with the ceramic support supporting the supportable portion, the thermal debinding being performed as part of sintering the metal part.

20. The method of claim 1, wherein the ceramic support comprises a plurality of layers.

* * * * *